(12) United States Patent
Abedini et al.

(10) Patent No.: US 12,193,040 B2
(45) Date of Patent: Jan. 7, 2025

(54) BEAM AND CELL SELECTION BASED ON POWER CONFIGURATION

(71) Applicant: QUALCOMM Incorporated, San Diego, CA (US)

(72) Inventors: Navid Abedini, Basking Ridge, NJ (US); Kapil Gulati, Belle Mead, NJ (US); Alessio Marcone, Nuremberg (DE); Muhammad Nazmul Islam, Littleton, MA (US); Jianghong Luo, Skillman, NJ (US); Tao Luo, San Diego, CA (US); Luca Blessent, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/115,728

(22) Filed: Dec. 8, 2020

(65) Prior Publication Data
US 2021/0176764 A1  Jun. 10, 2021

Related U.S. Application Data

(60) Provisional application No. 62/945,862, filed on Dec. 9, 2019.

(51) Int. Cl.
*H04W 72/541* (2023.01)
*H04W 48/20* (2009.01)
(Continued)

(52) U.S. Cl.
CPC ......... *H04W 72/541* (2023.01); *H04W 48/20* (2013.01); *H04W 72/046* (2013.01); *H04W 74/0833* (2013.01)

(58) Field of Classification Search
CPC . H04W 72/082; H04W 48/20; H04W 72/046; H04W 74/0833; H04W 48/16;
(Continued)

(56) References Cited

U.S. PATENT DOCUMENTS 10,798,748 B2 * 10/2020 Tavares ............... H04L 27/2663
11,051,256 B2 *  6/2021 Jeon .................. H04W 74/0833
(Continued)

FOREIGN PATENT DOCUMENTS

WO   WO-2022055414 A1 *  3/2022  ......... H04B 7/15557

OTHER PUBLICATIONS

AT&T: "Enhancements on Multi -Beam Operation for NR", 3GPP TSG-RAN WG1 Ad Hoc Meeting 1901, 3GPP Draft; R1-1900450 Enhancements On Multi-Beam Operation, 3rd Generation Partnership Project (3GPP), Mobile Competence Centre, 650, Route Des Lucioles, F-06921 Sophia-Anti Polis Cedex; France, vol. RAN WG1, No. Taipei, Taiwan; Jan. 21, 2019-Jan. 26, 2019, Jan. 20, 2019 (Jan. 20, 2019), 5 Pages, XP051593363, Retrieved from the Internet: URL: http://www.3gpp.org/ftp/Meetings%5F3GPP% 5FSYNC/RAN1/Docs/R1%2D1900450%2Ezip [retrieved on Jan. 20, 2019] Section 2, first paragraph, Section 4.
(Continued)

*Primary Examiner* — Kodzovi Acolatse
*Assistant Examiner* — Anindita Sen
(74) *Attorney, Agent, or Firm* — Patterson & Sheridan LLP

(57) ABSTRACT

Aspects of the present disclosure provide techniques for beam and cell selection based on power configuration of a wireless node (e.g., an Integrated Access and Backhaul (IAB) node). In some cases, the node monitors synchronization signal block (SSB) transmissions from one or more network entities, and selects a beam or cell based on the monitoring and one or more metrics designed to limit
(Continued)

potential interference caused by uplink transmissions from the first node.

30 Claims, 10 Drawing Sheets

(51) Int. Cl.
*H04W 72/044* (2023.01)
*H04W 74/0833* (2024.01)

(58) Field of Classification Search
CPC ........... H04W 56/0015; H04B 7/15535; H04B 7/0695
See application file for complete search history.

(56) References Cited

U.S. PATENT DOCUMENTS

| | | | | |
|---|---|---|---|---|
| 11,228,948 B2* | 1/2022 | Murray | ................. | H04W 36/04 |
| 11,234,268 B2* | 1/2022 | Jeon | ..................... | H04W 52/04 |
| 2018/0324853 A1* | 11/2018 | Jeon | ..................... | H04W 52/04 |
| 2019/0190582 A1* | 6/2019 | Guo | ..................... | H04L 1/0061 |
| 2019/0238287 A1 | 8/2019 | Zhou et al. | | |
| 2019/0312619 A1 | 10/2019 | Abedini et al. | | |
| 2019/0349061 A1* | 11/2019 | Cirik | ..................... | H04L 1/1861 |
| 2020/0037254 A1* | 1/2020 | Comsa | ................ | H04W 52/367 |
| 2020/0053655 A1* | 2/2020 | Ghosh | .................. | H04W 88/10 |
| 2020/0067657 A1* | 2/2020 | Dinan | ................. | H04W 52/367 |
| 2020/0145080 A1* | 5/2020 | Tang | ..................... | H04B 7/088 |
| 2020/0252882 A1* | 8/2020 | Charipadi | ........... | H04W 52/245 |
| 2020/0374737 A1* | 11/2020 | Dinan | ................. | H04W 56/001 |
| 2021/0195675 A1* | 6/2021 | Park | ..................... | H04W 24/00 |

OTHER PUBLICATIONS

International Search Report and Written Opinion—PCT/US2020/064068—ISA/EPO—Apr. 15, 2021.

* cited by examiner

Minimum Output Power

| Channel Bandwidth (MHz) | Minimum Output Power (dBm) | Measurement Bandwidth (MHz) |
|---|---|---|
| 5 | -40 | 4.515 |
| 10 | -40 | 9.375 |
| 15 | -40 | 14.235 |
| 20 | -40 | 19.095 |
| 25 | -39 | 23.955 |
| 30 | -38.2 | 28.815 |
| 40 | -37 | 38.895 |
| 50 | -36 | 48.615 |
| 60 | -35.2 | 58.35 |
| 80 | -34 | 78.15 |
| 90 | -33.5 | 88.23 |
| 100 | -33 | 98.31 |

FIG. 5A

Minimum Output Power for Power Class 1

| Operating Band | Channel Bandwidth (MHz) | Minimum Output Power (dBm) | Measurement Bandwidth (MHz) |
|---|---|---|---|
| n257, n258, n260, n261 | 50 | 4 | 47.52 |
| | 100 | 4 | 95.04 |
| | 200 | 4 | 190.08 |
| | 400 | 4 | 380.16 |

FIG. 5B

Minimum Output Power for Power Class 2,3, and 4

| Operating Band | Channel Bandwidth (MHz) | Minimum Output Power (dBm) | Measurement Bandwidth (MHz) |
|---|---|---|---|
| n257, n258, n260, n261 | 50 | -13 | 47.52 |
| | 100 | -13 | 95.04 |
| | 200 | -13 | 190.08 |
| | 400 | -13 | 380.16 |
| Note 1: n260 is not applied for power class 2. | | | |

FIG. 5C

RE Power Control Dynamic Range

| Modulation Scheme Used on the RE | RE Power Control Dynamic Range (dB) | |
|---|---|---|
| | (Down) | (Up) |
| QPSK (PDCCH) | -6 | +4 |
| QPSK (PDSCH) | -6 | +3 |
| 16QAM (PDSCH) | -3 | +3 |
| 64QAM (PDSCH) | 0 | 0 |
| 256QAM (PDSCH) | 0 | 0 |
| Note: The output power per carrier shall always be less or equal to the maximum output power of the base station. | | |

FIG. 5D

BEAM AND CELL SELECTION BASED ON POWER CONFIGURATION

PRIORITY CLAIM(S)

This application claims benefit of priority to U.S. Provisional Application No. 62/945,862, filed on Dec. 9, 2019, which is expressly incorporated by reference in its entirety as if fully set forth below and for all applicable purposes.

INTRODUCTION

Aspects of the present disclosure relate to wireless communications, and more particularly, to techniques for beam and cell selection based on Integrated Access and Backhaul (IAB) node transmit power configuration.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications by a first node (e.g., a UE or MU of an integrated access and backhaul (IAB) network). The method generally includes monitoring synchronization signal block (SSB) transmissions from one or more network entities, and selecting a beam or cell associated with one of the one or more network entities based on the monitoring, and one or more metrics associated with the monitored SSB transmissions, the one or more metrics being indicative of potential interference caused by uplink transmissions from the first node.

Certain aspects of the present disclosure are directed to an apparatus for wireless communication by a first node in an IAB. The apparatus generally includes a memory and at least one processor coupled to the memory, the memory and the at least one processor being configured to monitor SSB transmissions from one or more network entities, and select a beam or cell associated with one of the one or more network entities based on the monitoring, and one or more metrics associated with the monitored SSB transmissions, the one or more metrics being indicative of potential interference caused by uplink transmissions from the first node.

Certain aspects of the present disclosure are directed to an apparatus for wireless communication by a first node in an IAB. The apparatus generally includes means for monitoring SSB transmissions from one or more network entities, and means for selecting a beam or cell associated with one of the one or more network entities based on the monitoring, and one or more metrics associated with the monitored SSB transmissions, the one or more metrics being indicative of potential interference caused by uplink transmissions from the first node.

Certain aspects of the present disclosure are directed to a computer readable medium having instructions stored thereon for monitoring SSB transmissions from one or more network entities, and selecting a beam or cell associated with one of the one or more network entities based on the monitoring, and one or more metrics associated with the monitored SSB transmissions, the one or more metrics being indicative of potential interference caused by uplink transmissions from the first node.

Certain aspects provide a method for wireless communications by a network entity (e.g., a parent node/DU or CU of an integrated access and backhaul (IAB) network). The method generally includes determining a configuration of one or more metrics associated with SSB transmissions monitored by a first node of one or more wireless nodes to use in selecting a beam or cell, wherein the one or more metrics indicate potential interference caused by uplink transmissions from the first node, and transmitting an indication of the configuration to the first node.

Certain aspects of the present disclosure are directed to an apparatus for wireless communication by a first node in a network entity. The apparatus generally includes a memory and at least one processor coupled to the memory, the memory and the at least one processor being configured to determine a configuration of one or more metrics associated with SSB transmissions monitored by a first node of one or more wireless nodes to use in selecting a beam or cell, wherein the one or more metrics indicate potential interference caused by uplink transmissions from the first node, and transmit an indication of the configuration to the first node.

Certain aspects of the present disclosure are directed to an apparatus for wireless communication by a first node in a network entity. The apparatus generally includes means for determining a configuration of one or more metrics associated with SSB transmissions monitored by a first node of one or more wireless nodes to use in selecting a beam or cell, wherein the one or more metrics indicate potential interference caused by uplink transmissions from the first node, and means for transmitting an indication of the configuration to the first node.

Certain aspects of the present disclosure are directed to a computer readable medium having instructions stored thereon for determining a configuration of one or more metrics associated with SSB transmissions monitored by a first node of one or more wireless nodes to use in selecting a beam or cell, wherein the one or more metrics indicate potential interference caused by uplink transmissions from the first node, and transmitting an indication of the configuration to the first node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 5A-5D illustrate example power requirements.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques for beam and cell selection based on an Integrated Access and Backhaul (IAB) node power configuration. In some cases, the IAB node monitors synchronization signal block (SSB) transmissions from one or more network entities, and selects a beam or cell based on the monitoring and one or more metrics designed to limit potential interference caused by uplink transmissions from the first node.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
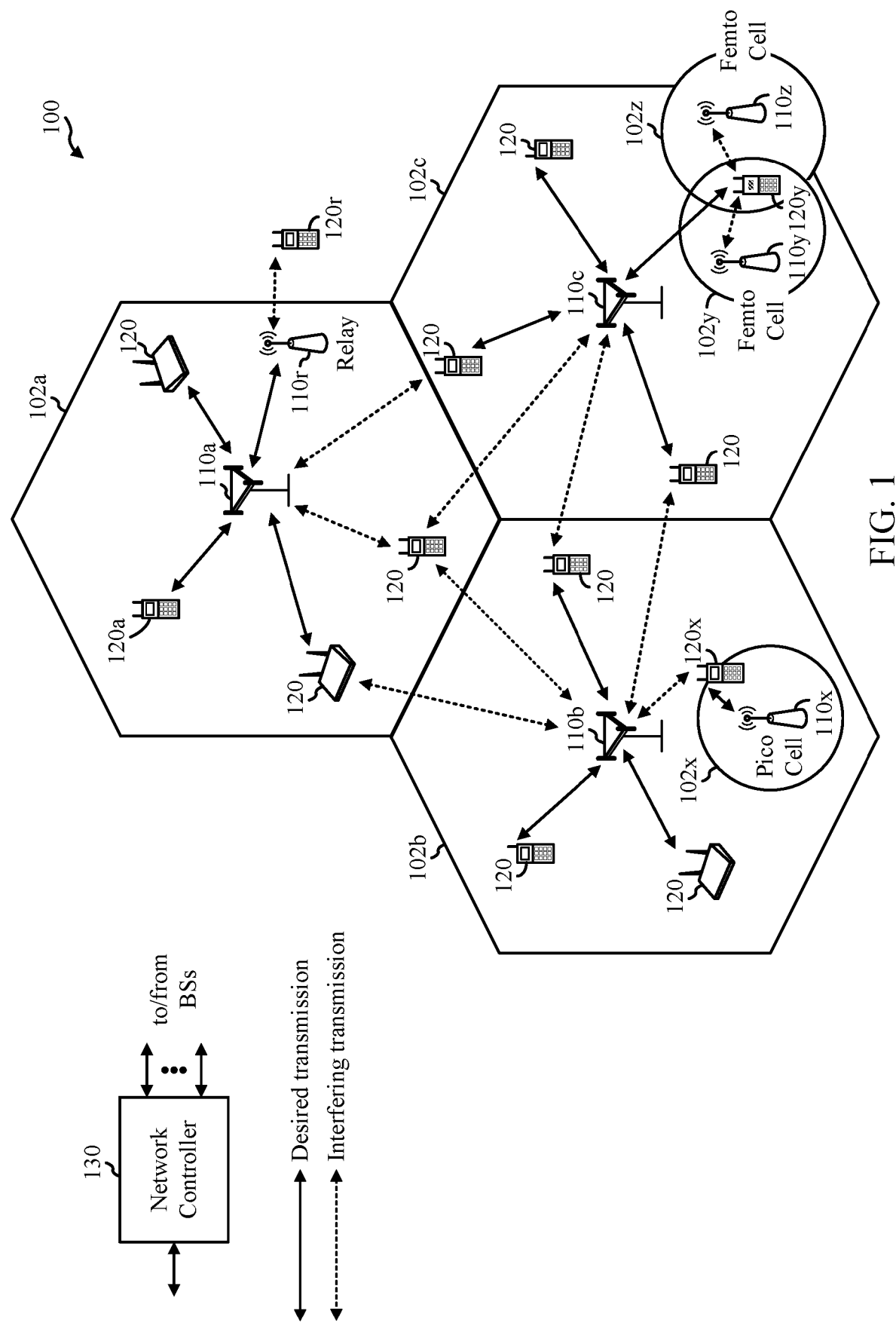
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the network 100 may include an IAB-node (implemented as a UE 120 or BS 110) configured to perform operations 600 of FIG. 6 and a network entity (e.g., a BS 110) configured to perform operations 700 of FIG. 7.

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 20x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
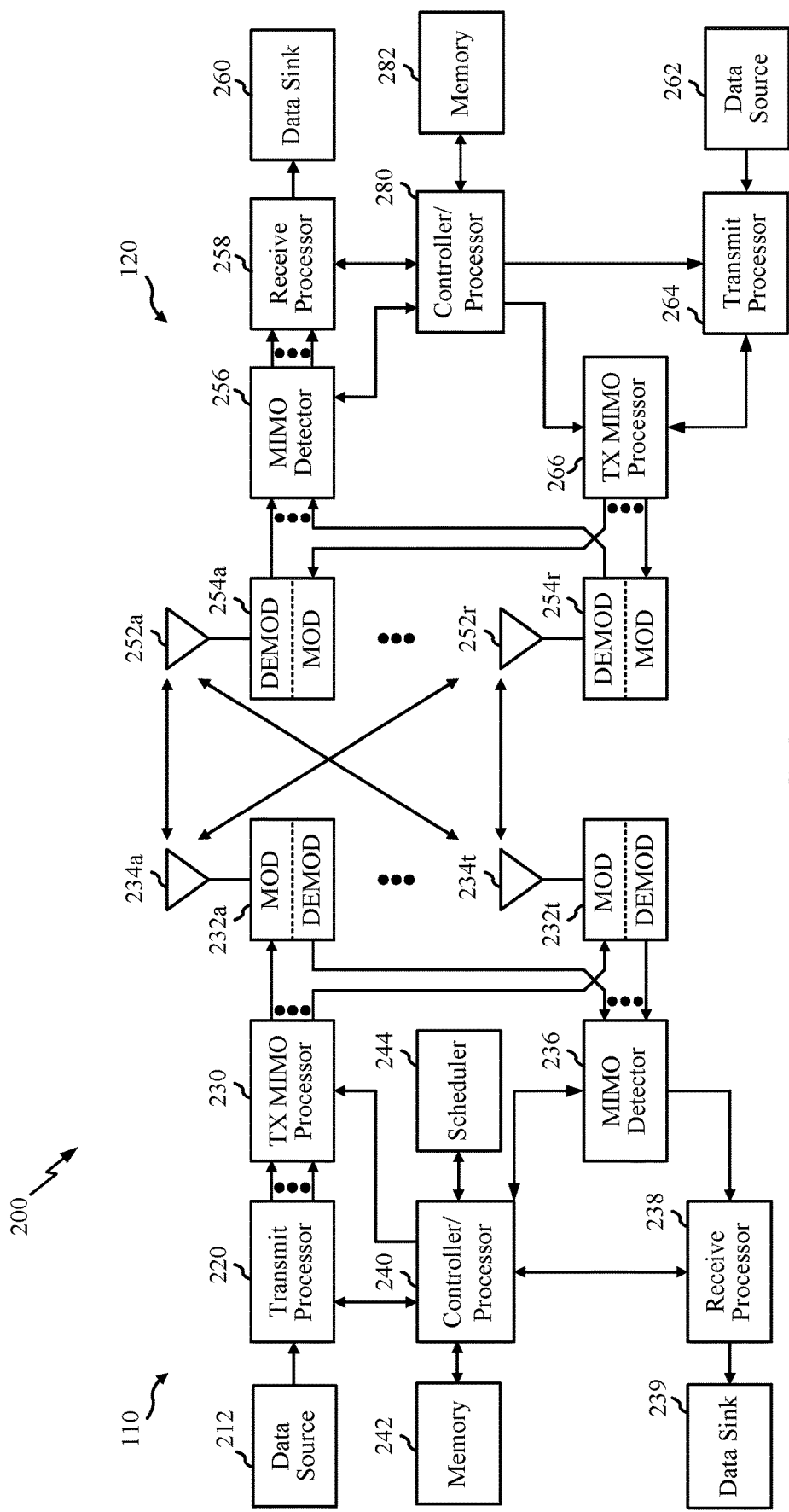
FIG. 2 is a block diagram conceptually illustrating a design of an example a base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

It should be noted that though FIG. 2 illustrates UE 120 communicating with a BS 110, a child IAB-node may similar communicate with a parent IAB-node (or other network entity) and each may (e.g., respectively) have similar components as discussed with respect to FIG. 2. In other words, a child IAB-node may have similar components as UE 120 and may be configured to perform operations 600 of FIG. 6, while a parent IAB-node (or other network entity) may have similar components as BS 110 and may be configured to perform operations 700 of FIG. 7.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive downlink signals from the BS 110 or a parent IAB-node, or a child IAB-node may receive downlink signals from a parent IAB-node, and may provide received signals to the demodulators (DEMODs) in transceivers 254a-254r, respectively. Each demodulator 254 may condition (e.g., filter, amplify, downconvert, and digitize) a respective received signal to obtain input samples.

Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110 or a parent IAB-node.

At the BS 110 or a parent IAB-node, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The controller/processor 280 and/or other processors and modules at the UE 120 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
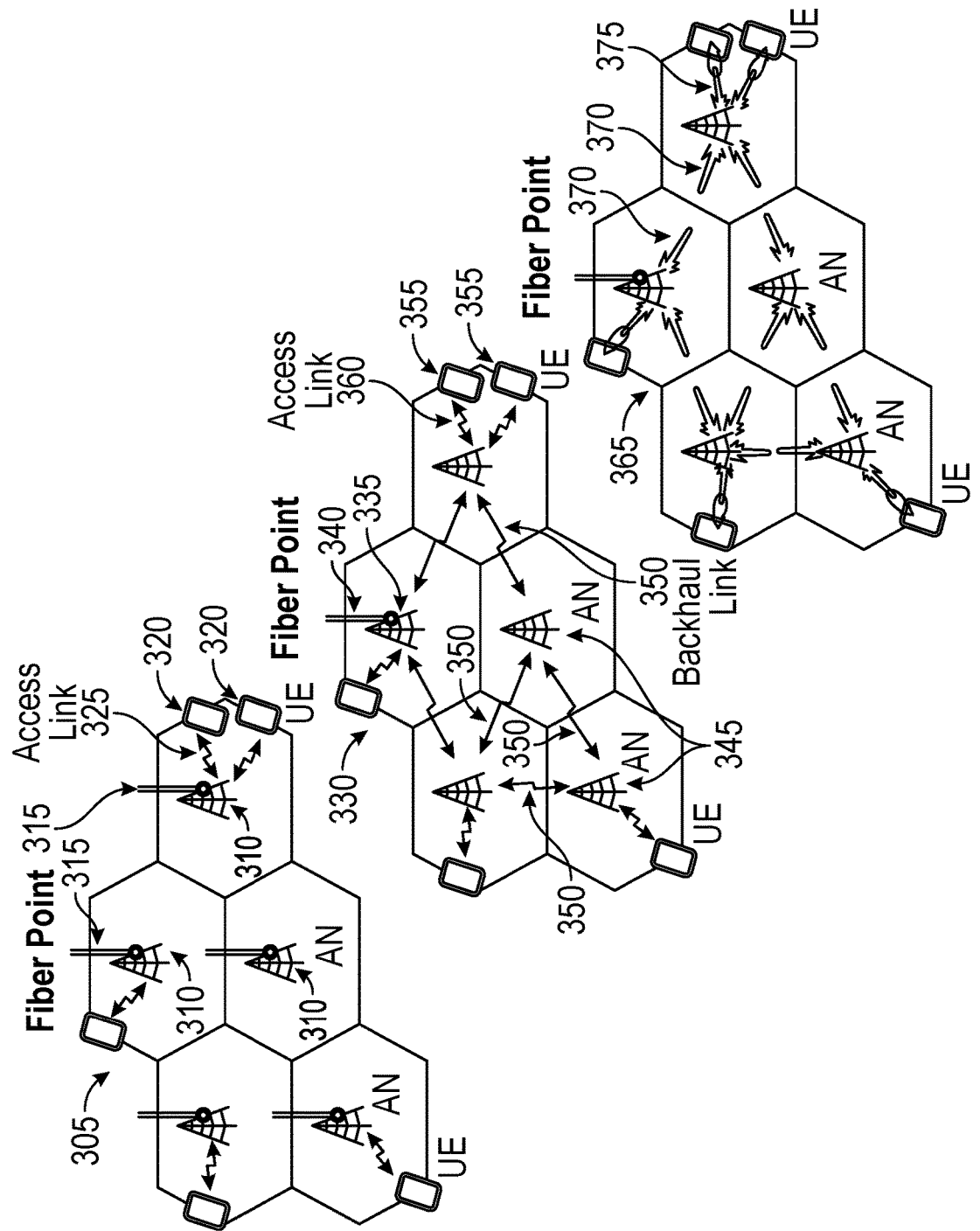
FIG. 3 is a diagram illustrating examples of radio access networks, in accordance with various aspects of the present disclosure.

FIG. 3 is a diagram illustrating examples of radio access networks, in accordance with various aspects of the disclosure.

As shown by reference number 305, a traditional (for example, 3G, 4G, LTE) radio access network may include multiple base stations 310 (for example, access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network. In some aspects or scenarios, a wireless backhaul network may sometimes be referred to as an integrated access and backhaul (IAB) network. An IAB network may include multiple base stations and sometimes the base stations may be of differing types or have differing operational characteristics. For example, in some aspects, an IAB network may have at least one base station that is an anchor base station 335. The anchor base station may communicates with a core network via a wired backhaul link 340, such as a fiber connection. An anchor base station 335 may also be referred to as an IAB donor. Anchor base stations can be configured to communicate with other types of base stations or other communication devices (e.g. in a radio network or IAB network).

The IAB network may also include one or more non-anchor base stations 345. Non-anchor base stations may be referred to as relay base stations or IAB nodes. The non-anchor base station 345 may communicate directly with or indirectly with (for example, via one or more other non-anchor base stations 345) the anchor base station 335 via one or more backhaul links 350 to form a backhaul path to the core network for carrying backhaul traffic. Backhaul link 350 may be a wireless link. Anchor base station(s) 335 or non-anchor base station(s) 345 may communicate with one or more UEs 355 via access links 360, which may be wireless links for carrying access traffic. In some aspects, an anchor base station 335 or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between base stations or UEs (for example, between two base stations, between two UEs, or between a base station and a UE). In additional or alternative aspects or examples, wireless backhaul links 370 between base stations may use millimeter waves to carry information or may be directed toward a target base station using beamforming, precoding. Similarly, the wireless access links 375 between a UE and a base station may use millimeter waves or may be directed toward a target wireless node (for example, a UE or a base station). In this way, inter-link interference may be reduced.

In some aspects, an IAB network may support a multi-hop network or a multi-hop wireless backhaul. Additionally, or alternatively, each node of an IAB network may use the same radio access technology (for example, 5G/NR). Additionally, or alternatively, nodes of an IAB network may share resources for access links and backhaul links, such as time resources, frequency resources, spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with base station 110 for that IAB node, and an MT of an IAB node may perform functions described in connection with UE 120 for that IAB node.

Figure 4:
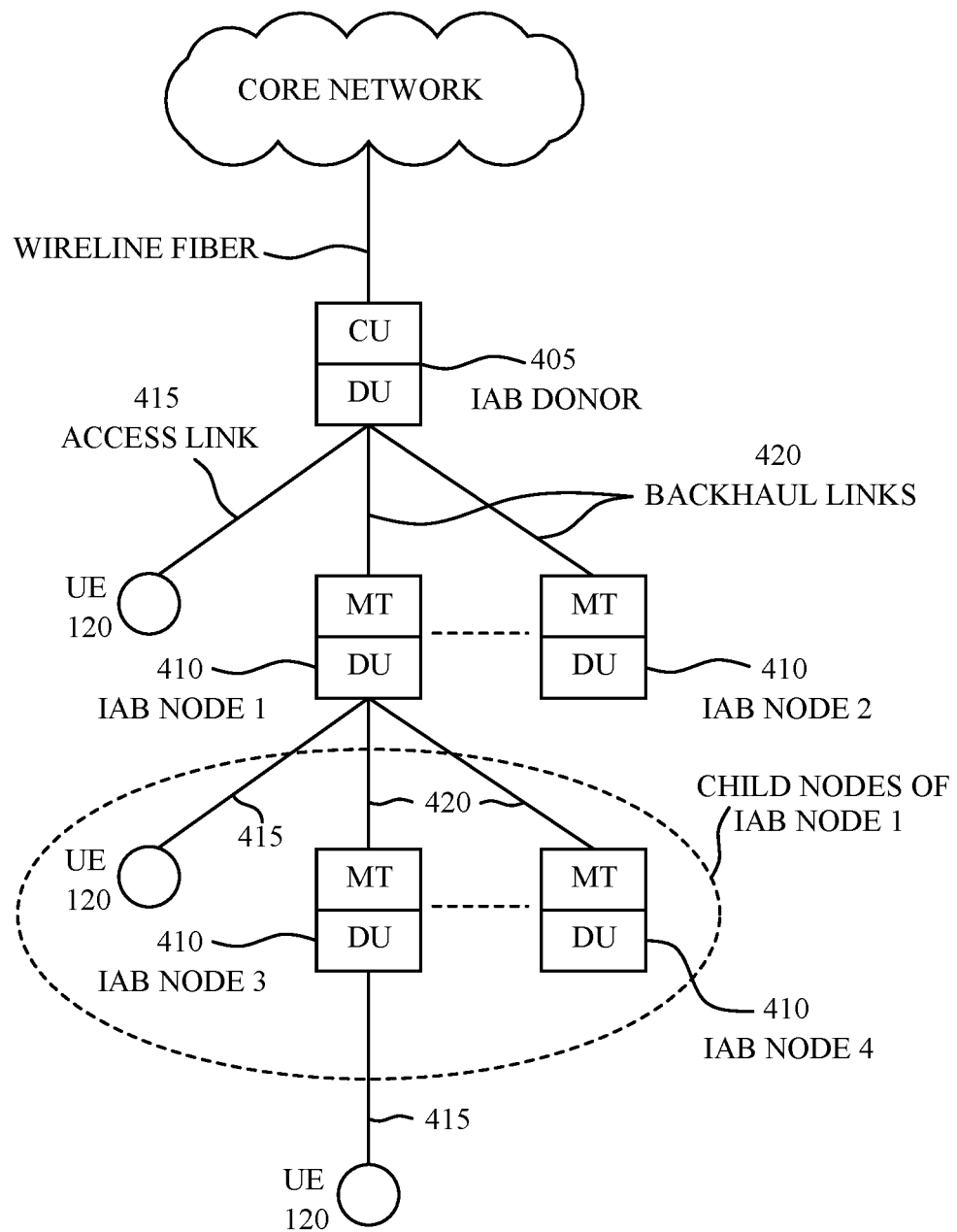
FIG. 4 is a diagram illustrating an example of an integrated access and backhaul (IAB) network architecture in accordance with various aspects of the disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (for example, as a wireline fiber). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 application protocol (F1AP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415.

Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor base stations) are stationary (that is, non-moving). Next generation (5G) wireless networks have stated objectives to provide ultra-high data rate and support wide scope of application scenarios. Integrated access and backhaul (IAB) systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement PHY/MAC/RLC layers.

Example IAB Power Configuration

Aspects of the present disclosure provide techniques for addressing scenarios where the minimum transmit power supported by an Integrated Access and Backhaul (IAB) node is above a minimum value specified by a standard. In some cases, the IAB node may signal information regarding its power configuration so a network entity of the IAB may take it into account (e.g., when allocating or scheduling resources). The power configuration may include an indication of the minimum transmit power supported by the IAB node and/or an indication of a guard band that may help the IAB node control adjacent channel leakage.

Standard specifications (e.g., 3GPP TS 38.101) define minimum output (transmit) power requirements for a UE. The values vary with frequency band and operating channel within the frequency bands. For example, FIG. 5A illustrates example minimum output power requirements for Frequency Range 1 (FR1) that includes sub-6 GHz frequency bands, while FIGS. 5B and 5C illustrate minimum output power requirements for Frequency Range 2 (FR2) that includes frequency bands from 24.25 GHz to 52.6 GHz. As illustrated in FIGS. 5B and 5C, the minimum output power requirements also depend on the power class (FIG. 5B shows values for power class 1, while FIG. 5C shows values for power classes 2, 3, and 4). There may also be requirements regarding adjacent channel leakage ratio (ACLR) (e.g., the ratio of the filtered mean power centered on the assigned channel frequency to the filtered mean power centered on an adjacent cannel frequency). Base stations may also have power configuration requirements. For example, FIG. 5D illustrates minimum requirements for resource element (RE) power dynamic control range.

In certain scenarios, an IAB MT may not be able to support a minimum output power requirement specified by a standard. For example, if a shared architecture is used for both MT and DU of an IAB-node, then the MT and DU will have same power configuration and capabilities. Conventionally, a DU (analogous to a BS) has a large output power, and very limited dynamic range (the BSs minimum TX power may still be relatively high). Sharing the same architecture for the MT the, the minimum transmit power supported by the MT may be higher than the minimum requirement specified in a standard.

Having the minimum power supported by the MT be higher than the requirement specified in a standard may create various issues. For example, the MT may not be able to perform proper UL power control for MT. As a result, the MT's UL transmissions may cause interference in the same and adjacent channels.

To address interference in the same channel, interference mitigation techniques may be used, but at some cost. For example, to mitigate intra-cell interference, a scheduler may not be able to frequency division multiplex (FDM) another UL communications. To mitigate Inter-cell (co-channel) interference, relatively complex inter cell interference coordination (ICIC) techniques may be used.

As noted above, to address adjacent channel interference, the standard specification may have ACLR requirements. Per these requirements, the transmitter is supposed to suppress its leakage to adjacent channels to some acceptable level by applying proper filters. Unfortunately, controlling leakage to adjacent channels is more difficult with a larger minimum transmit power. While this could be addressed by tightening the ACLR requirements for the MTs to make sure the adjacent channel leakage is still controlled, this may require more aggressive filtering at the MT transmitter (which may significantly increase cost).

In some cases, signaling may be introduced to allow a device (e.g., an IAB node) to indicate its minimum supported TX power to the network. This signaling could be provided, for example, by adding a new element of a power class, or indicated separately (e.g., via an RRC message) by the device to the network. The signaling could provide an indication of the minimum TX power as a metric, for example, in terms of Effective Isotropic Radiated Power (EIRP) and/or Total Radiated Power (TRP). As noted above, minimum TX power may be configured for different operating bands and/or channel bandwidth.

Given the indication the minimum TX power supported by the MT may be greater than the minimum specified in the standard, the network may take this into consideration when scheduling and/or allocating resources for UL transmission from the MT. For example, a base station (IAB DU) may schedule the UL transmissions to occur in the center of the channel. Scheduling in this manner and leaving enough guard-band on the edges may help suppress adjacent channel leakage.

In some cases, the MT may indicate a guard-band that is sufficient to meet the ACLR specifications. For example, the MT may indicate that if a target TX power is less than the minimum TX power it supports, then the MT may need a number (N_RB) of RBs as a guard band (for "back off") to meet the ACLR specification. In some cases, a standard specification may indicate a limit on the maximum value for N_RB. In some cases, the value of N RB indicated by MT and/or the limit on the maximum value for N_RB may be band-dependent and/or channel-bandwidth-dependent.

In some cases, rather than indicate a guard-band in terms of a number of RBs, an MT may provide a similar such indication in terms of frequency resources, such as a bandwidth part (BWP). For example, the MT may indicate the largest BWP that the MT can support (e.g., assuming centered at the channel BW, or centered on a configured/indicated offset).

In some cases, an MT may not provide a prior indication of a BWP but, rather, the MT may be configured with one or multiple BWPs. In such cases, the MT may provide some indication whether it can support the configured BWP(s).

The MT's UL transmission does not need to always be centered around the center of the channel BW. For example, in some cases there may be no other network operating on the adjacent channel on one side or either sides of the current channel. As another example, with enough guard band, the leakage may be kept below the desired level even if the transmitted UL signal is not at the center of channel BW.

Therefore, the MT's UL assignment may be flexibly configured in a BWP not at the center. In some cases, the MT may provide further assisting information (e.g., to assist in scheduling) such as a desired (or required) guard band for a given center frequency.

The actual N_RB or BWP indicated by an MT may depend on the amount of power mismatch (e.g., supported min TX power—target TX power). For example, the indicated value may correspond to a maximum power mismatch (e.g., the supported min TX power—standard specified min TX power). As another example, a set of indications for various mismatch values may be provided.

Example Beam and Cell Selection based on Power Configuration

As mentioned, some types of wireless devices such as an integrated access backhaul (IAB) mobile terminal (MT) may not be able to support minimum output power requirements (e.g., in case a shared architecture is used for both MT and distributed unit (DU) of an IAB node). Signaling (e.g., radio resource control (RRC) of a new power class) may be used to indicate the minimum transmit power of an IAB MT. Excessive interference caused by such larger transmit power compared to the minimum transmit power of an IAB MT, whether intra-cell and inter-cell (e.g., co-channel) interference, may require proper or coordinated resource allocation and scheduling. For adjacent channel interference, large guard-bands can be used to further suppress the leakage to adjacent channels.

In some scenarios, such as for random access channel (RACH) configurations, the network (e.g., a network entity) can configure initial uplink (UL) bandwidth parts (BWPs) and/or RACH resources/configurations based on the power configuration (e.g., the minimum supported transmit power) of the MTs.

In some cases, a minimum transmit power supported by an IAB MT is greater than that specified in a standard, but the IAB MT may still meet the adjacent channel leakage ratio (ACLR) requirements (e.g., through filtering). However, the increased transmission power may still cause interference (e.g., in the same cell) if its UL transmit power cannot be controlled properly.

Accordingly, when selecting a beam or a cell, and/or evaluating the quality of a cell, it may be desirable for the IAB MT to be aware of the potential interference it may cause and take steps to avoid such potential interference.

Generally, during cell selection and/or reselection, the UE searches for synchronization signal blocks (SSBs) to detect new cells. The UE may have prior knowledge of resources/configurations (e.g., physical cell identifier (PCI)) for detecting the new cells. Furthermore, the UE may measure detected SSBs to determine the quality of a cell, SSB, and/or beam to use for communicating. For initial cell selection, the UE selects any cell for which it has detected an SSB. If the UE detects multiple cells, the UE may select a cell based on signal strength (e.g., selecting a cell with the greatest signal strength). For cell reselection, the UE measures the quality of the serving and detected cells (e.g., based on the detected SSB(s)) and checks the cell reselection criteria.

Aspects of the present disclosure provide techniques that may be used to help mitigate adverse effects when an IAB MT (also referred to herein as a MT) is not able to support minimum output power requirement. For example, an IAB MT may select a beam or cell based on one or more metrics to limit potential interference as a result of monitoring (and detecting) SSB transmissions from one or more network entities. In some cases, the IAB MT may select the beam or cell to limit potential interference based on one or more thresholds associated with received signal power. While the techniques presented herein are described with reference to IAB networks and corresponding nodes, the techniques may be more generally applied to any type of wireless node (e.g., generally to UEs and/or base stations (BSs)).

Figure 6:
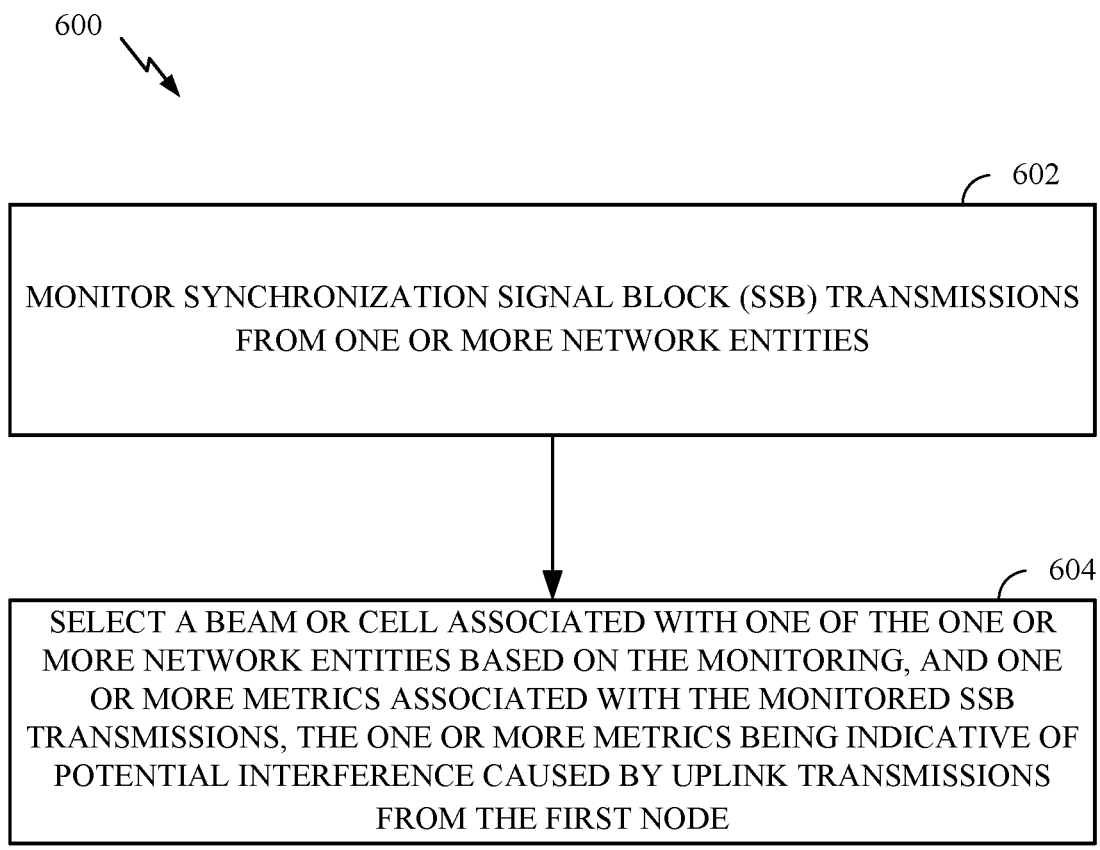
FIG. 6 illustrates a flow diagram illustrating example operations for wireless communication by a first node of an integrated access and backhaul (IAB) network, in accordance with various aspects of the disclosure.

FIG. 6 is a flow diagram illustrating example operations 600 for wireless communication by a first node (e.g., of an integrated access and backhaul (IAB) network), in accordance with certain aspects of the present disclosure. For example, operations 600 may be performed by a parent IAB node. Operations 600 may be implemented as software components that are executed and run on one or more processors (e.g., controller/processor 240 of FIG. 2). Further, the transmission and reception of signals by the first wireless communication device in operations 600 may be enabled, for example, by one or more antennas (e.g., antennas 234 of FIG. 2). In certain aspects, the transmission and/or reception of signals by the first wireless communication device may be implemented via a bus interface of one or more processors (e.g., controller/processor 230, 220, 238, 240, and 244) obtaining and/or outputting signals.

Operations 600 may begin, at 602, by monitoring SSB transmissions from one or more network entities. At 604, the first node selects a beam or cell associated with one of the one or more network entities based on the monitoring, and one or more metrics associated with the monitored SSB transmissions, the one or more metrics being indicative of potential interference caused by uplink transmissions from the first node.

Figure 7:
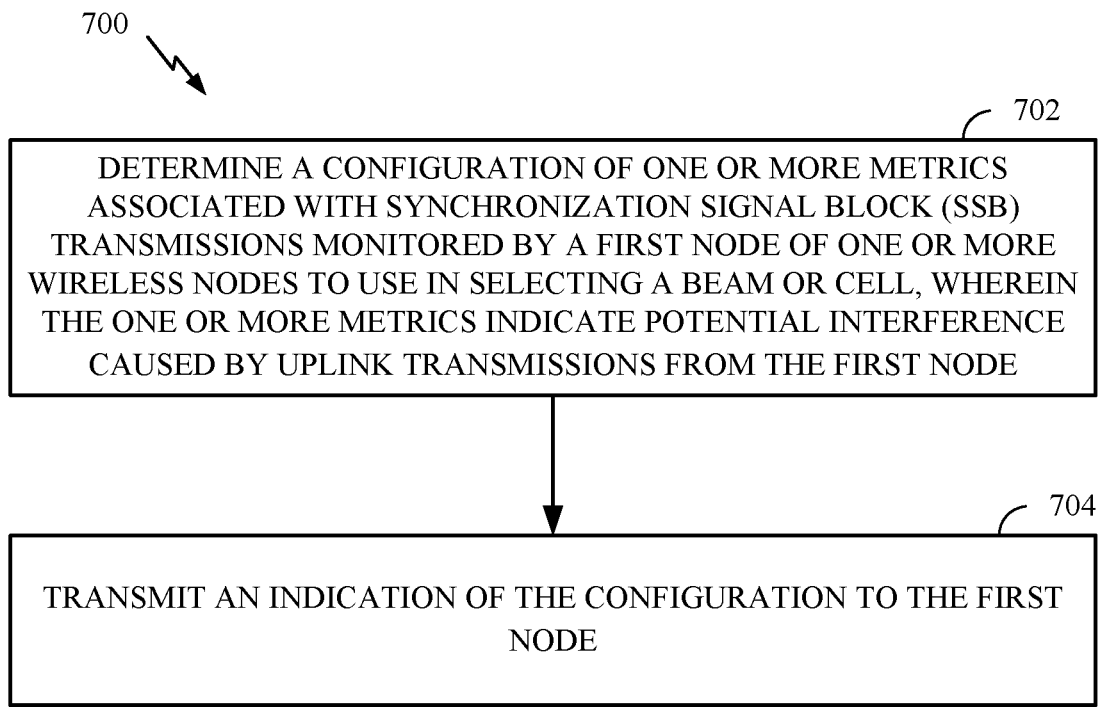
FIG. 7 illustrates a flow diagram illustrating example operations for wireless communication by a network entity of an integrated access and backhaul (IAB) network, in accordance with various aspects of the disclosure.

FIG. 7 is a flow diagram illustrating example operations 700 for wireless communication by a network entity (e.g., a DU or CU of an integrated access and backhaul (IAB) network, in accordance with certain aspects of the present disclosure. Operations 700 may be implemented as software components that are executed and run on one or more processors (e.g., controller/processor 280 of FIG. 2). Further, the transmission and reception of signals by the first wireless communication device in operations 700 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 700 begin, at 702, by determining a configuration of one or more metrics associated with SSB transmissions monitored by a first node of one or more wireless nodes to use in selecting a beam or cell, wherein the one or more metrics indicate potential interference caused by uplink transmissions from the first node. At 704, the network entity transmits an indication of the configuration to the first node.

In some aspects, the MT finds a suitable cell for reselection with consideration to its increased minimum transmission power (e.g., relative to a standard). A cell may be considered suitable if at least one beam can be found that will not cause excessive interference in UL. Excessive interference may be defined based on a threshold (e.g., threshold X) on the estimated UL receive power if the MT uses the minimum transmit power and the corresponding beam. In some aspects, the MT evaluates the quality metric of a suitable cell based on SS-RSRP and/or synchronization signal (SS) reference signal received quality (SS-RSRQ). These SSBs are considered for which using the associated beams on UL will not cause excessive interference (e.g., have a receive power above the threshold X).

In some aspects, the MT selects an SSB and associated RACH when accessing a selected or detected cell. The MT determines another threshold (e.g., threshold Y), and, if at least one SSB with SS-RSRP is less than threshold Y, then the MT may select one SSB with a lowest SS-RSRP among the other SSBs below the threshold Y. However, if all detected SSB(s) with SS-RSRP are greater than the threshold Y, the MT may select the weakest SSB (e.g., with the lowest SS-RSRSP) for sending RACH. In this case, the MT may adopt a modified RACH configuration. For example, the MT may reduce the maximum number of retransmissions and/or not allow retransmissions at all. In some aspects, if all of the detected SSB(s) with SS-RSRP for the cell are greater than the threshold, the MT may not send RACH to the selected cell at all.

In some aspects, the threshold values (e.g., threshold X and threshold Y) may be the same or different. The threshold values may be defined by a standard specification or indicated by the network (e.g., via RRC configuration signaling). In some cases, the thresholds may be calculated by the MT. For example, the threshold values may be calculated by the MT based on the RACH configuration of a cell (e.g., including the RACH target receive power).

In some cases, the calculations by the IAB MT may depend on the RACH target receiver power after a certain number of power ramping steps. This certain number of power ramping steps may be 0 or indicated and/or configured.

In some cases, the RACH target receive power may be the initial random access preamble power (e.g., preambleReceivedTargetPower). In some aspects, the calculations by the MT may depend the RACH target receive power after a maximum number of power ramping steps. For example, the UE may calculate:

$$\text{preambleReceivedTargetPower} + (\text{preambleTransMax} \times \text{powerRampingStep})$$

Figure 8:
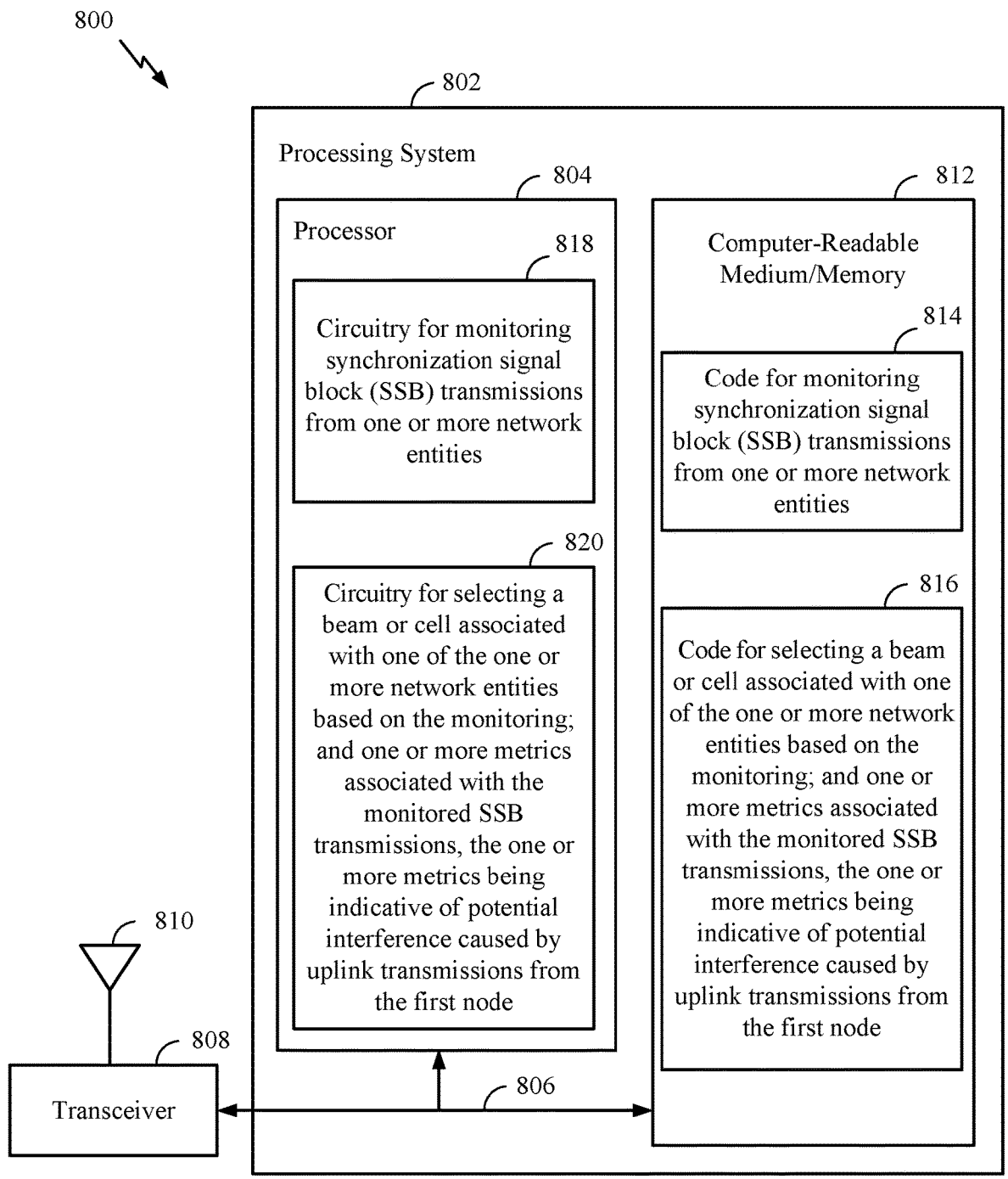
FIG. 8 illustrates a communications device that may include various components configured to perform operations for the techniques disclosed herein, in accordance with aspects of the present disclosure.

FIG. 8 illustrates a communications device 800 (e.g., a transmitter such as a UE) that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein. In certain aspects, computer-readable medium/memory 812 stores code 814 for monitoring SSB transmissions from one or more network entities; and code 816 for selecting a beam or cell associated with one of the one or more network entities based on the monitoring, and one or more metrics associated with the monitored SSB transmissions, the one or more metrics being indicative of potential interference caused by uplink transmissions from the first node. In certain aspects, the processor 804 has circuitry configured to implement the code stored in the computer-readable medium/memory 812. The processor 804 includes circuitry 818 for monitoring SSB transmissions from one or more network entities; and circuitry 820 for selecting a beam or cell associated with one of the one or more network entities based on the monitoring, and one or more metrics associated with the monitored SSB transmissions, the one or more metrics being indicative of potential interference caused by uplink transmissions from the first node.

Figure 9:
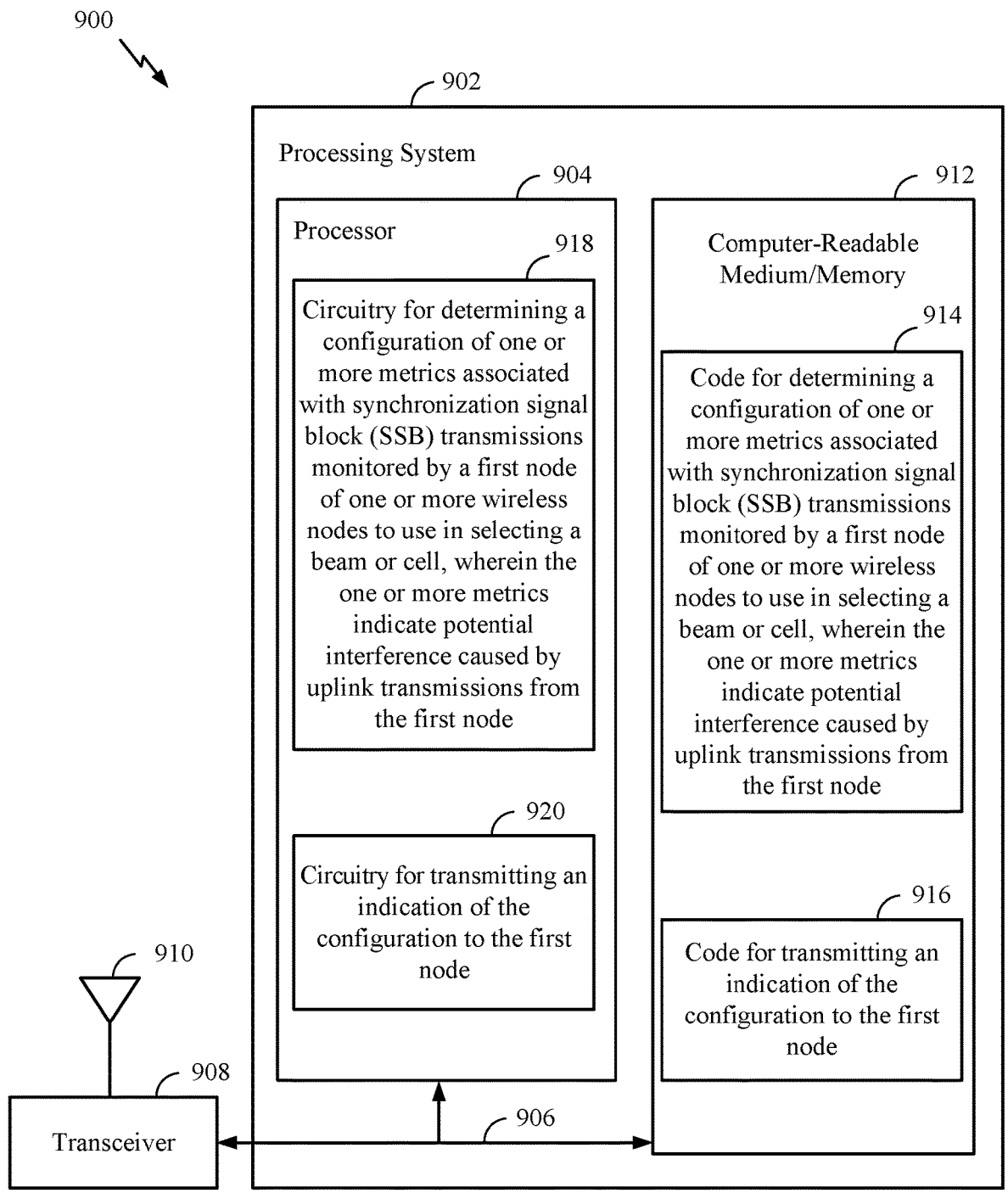
FIG. 9 illustrates a communications device that may include various components configured to perform operations for the techniques disclosed herein, in accordance with aspects of the present disclosure.

FIG. 9 illustrates a communications device 900 (e.g., a receiver such as a gNB) that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein. In certain aspects, computer-readable medium/memory 912 stores code 914 for determining a configuration of one or more metrics associated with SSB transmissions monitored by a first node of one or more wireless nodes to use in selecting a beam or cell, wherein the one or more metrics indicate potential interference caused by uplink transmissions from the first node; and code 916 for transmitting an indication of the configuration to the first node. In certain aspects, the processor 904 has circuitry configured to implement the code stored in the computer-readable medium/memory 912. The processor 904 includes circuitry 918 for determining a configuration of one or more metrics associated with SSB transmissions monitored by a first node of one or more wireless nodes to use in selecting a beam or cell, wherein the one or more metrics indicate potential interference caused by uplink transmissions from the first node; and circuitry 920 for transmitting an indication of the configuration to the first node.

Example Aspects

Aspect 1: A method for wireless communications by a first node of a network, comprising monitoring synchronization signal block (SSB) transmissions from one or more network entities; and selecting a beam or cell associated with one of the one or more network entities based on the monitoring; and one or more metrics associated with the monitored SSB transmissions, the one or more metrics being indicative of potential interference caused by uplink transmissions from the first node.

Aspect 2: The method of Aspect 1, wherein the first node comprises a node of an integrated access and backhaul (TAB) network.

Aspect 3: The method of Aspect 2, wherein the first node uses a shared architecture for both a mobile termination (MT) component and a distributed unit (DU).

Aspect 4: The method of any of Aspects 1-3, wherein the selecting the beam or cell is based on an indication of a configuration received from a network entity configuring the first node with the one or more metrics for selecting the beam or cell based on the monitoring of the SSB transmissions.

Aspect 5: The method of any of Aspects 1-4, wherein the selecting the beam or cell limits the potential interference caused by the uplink transmissions from the first node.

Aspect 6: The method of any of Aspects 1-5, wherein the selecting comprising identifying a suitable cell for selection or reselection based on the one or more metrics.

Aspect 7: The method of Aspect 6, wherein the identifying is based on evaluating a quality metric of a set of synchronization signal blocks (SSBs) based on at least one of a synchronization signal reference signal received power (SS-RSRP) or an SS reference signal received quality (SS-RSRQ); and the first node only considers SSBs for which using associated beams for uplink transmissions from the first node is not expected to cause excessive interference.

Aspect 8: The method of Aspect 7, wherein the selecting comprising selecting an SSB and associated random access channel (RACH) configuration to access a cell detected based on the monitoring.

Aspect 9: The method of Aspect 8, wherein an SSB is considered for selection if it has a synchronization signal reference signal received power (SS-RSRP) at or below a second threshold value of the one or more threshold values.

Aspect 10: The method of Aspect 9, wherein, if no SSB is detected with an SS-RSRP at or below the second threshold value, the first node selects a detected SSB with a lower SS-RSRP than one or more other detected SSBs.

Aspect 11: The method of Aspect 10, further comprising performing a RACH procedure based on the selected SSB and a RACH configuration that is modified relative to a default RACH configuration.

Aspect 12: The method of Aspect 11, wherein the modification to the RACH configuration comprises a reduced maximum number of retransmissions.

Aspect 13: The method of any of Aspects 9-12, wherein, if no SSB is detected with an SS-RSRP at or below the second threshold value, refraining from performing a RACH procedure for the detected cell.

Aspect 14: The method of any of Aspects 6-13, wherein the one or more metrics comprise one or more threshold values comprising a first threshold value.

Aspect 15: The method of Aspect 14, wherein a cell is identified as suitable for selection or reselection if at least one beam is found, based on the monitoring, for which uplink transmissions from the first node are not expected to cause excessive interference.

Aspect 16: The method of Aspect 15, wherein the at least one beam for which uplink transmissions from the first node are not expected to cause excessive interference is found based on whether an estimated uplink received power, if the first node transmits on the at least one beam at a minimum supported transmit power, is at or below the first threshold value of the one or more threshold values.

Aspect 17: The method of any of Aspects 14-16, wherein the one or more threshold values comprise at least two threshold values; and the at least two threshold values are different.

Aspect 18: The method of Aspect 17, wherein the one or more threshold values are defined by a standard specification; indicated by network signaling; or calculated by the first node.

Aspect 19: The method of Aspect 18, wherein one or more threshold values are calculated by the first node based on a RACH configuration of a cell.

Aspect 20: The method of Aspect 19, wherein one or more threshold values are calculated by the first node based on a RACH target receive power and an offset value.

Aspect 21: The method of Aspect 20, wherein the offset value is configured to be zero.

Aspect 22: The method of Aspect 20 or 21, wherein one or more threshold values are calculated by the first node based on a RACH target receive power after a maximum number of power ramping steps.

Aspect 23: The method of any of Aspects 20-22, wherein one or more threshold values are calculated by the first node based on a RACH initial target receive power.

Aspect 24: A method for wireless communications by a network entity, comprising determining a configuration of one or more metrics associated with synchronization signal block (SSB) transmissions monitored by a first node of one or more wireless nodes to use in selecting a beam or cell, wherein the one or more metrics indicate potential interference caused by uplink transmissions from the first node; and transmitting an indication of the configuration to the first node.

Aspect 25: The method of Aspect 24, wherein the network entity comprises a network entity of an integrated access and backhaul (TAB) network; and the first node comprises a node of the IAB network.

Aspect 26: The method of Aspect 24 or 25, wherein the one or more metrics comprise one or more threshold values.

Aspect 27: The method of Aspect 26, wherein the first node is configured to identify a cell as suitable for selection or reselection if an estimated uplink received power if the first node transmits on the beam at a minimum supported transmit power is at or below a first threshold value of the one or more thresholds.

Aspect 28: The method of Aspect 27, wherein the first threshold value comprises a random access channel (RACH) target receive power threshold value.

Aspect 29: An apparatus for wireless communications by a first node of a network, comprising at least one processor; and a memory coupled to the at least one processor, the memory comprising code executable by the at least one processor to cause the apparatus to monitor synchronization signal block (SSB) transmissions from one or more network entities; and select a beam or cell associated with one of the one or more network entities based on the monitoring; and one or more metrics associated with the monitored SSB transmissions, the one or more metrics being indicative of potential interference caused by uplink transmissions from the first node.

Aspect 30: An apparatus for wireless communications, comprising at least one processor; and a memory coupled to the at least one processor, the memory comprising code executable by the at least one processor to cause the apparatus to determine a configuration of one or more metrics associated with synchronization signal block (SSB) transmissions monitored by a first node of one or more wireless nodes to use in selecting a beam or cell, wherein the one or more metrics indicate potential interference caused by uplink transmissions from the first node; and transmit an indication of the configuration to the first node.

Aspect 31: An apparatus comprising means for performing one or more of the operations of Aspects 1-28.

Aspect 32: A computer-readable medium having code stored thereon for executing one or more of the operations of Aspects 1-28.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UNITS). LTE and LTE-A are releases of UNITS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system. For example, in some cases, processors such as those shown in FIG. 2 may be configured to perform operations 600 of FIG. 6 and/or operations 700 of FIG. 7.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6 and/or FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications by a first node of a network, comprising: at least one processor and a memory configured to:
monitor synchronization signal block (SSB) transmissions from one or more network entities; and
select a beam or cell associated with one of the one or more network entities based on:
the monitoring; and
one or more metrics associated with the monitored SSB transmissions, the one or more metrics comprise a first threshold value and are indicative of potential interference caused by uplink transmissions from the first node, wherein the selection further comprises selecting the beam for which the uplink transmissions from the first node using the selected beam at a minimum supported transmit power of the first node do not cause excessive interference based on whether an estimated uplink received power is at or below the first threshold value, and wherein the excessive interference is defined based on the first threshold value.

2. The apparatus of claim 1, wherein the first node comprises a node of an integrated access and backhaul (IAB) network.

3. The apparatus of claim 2, wherein the first node uses a shared architecture for both a mobile termination (MT) component and a distributed unit (DU).

4. The apparatus of claim 1, wherein the at least one processor and the memory are configured to select the beam or cell is based on an indication of a configuration received from a network entity configuring the first node with the one or more metrics for selecting the beam or cell based on the monitoring of SSB transmissions.

5. The apparatus of claim 1, wherein the selection of the beam or cell limits the potential interference caused by the uplink transmissions from the first node.

6. The apparatus of claim 1, wherein the at least one processor and the memory are configured to select the beam or cell by identifying a suitable cell for selection or reselection based on the one or more metrics, wherein the one or more metrics comprise one or more threshold values including the first threshold value.

7. The apparatus of claim 6, wherein:
the identifying is based on evaluating a quality metric of a set of SSBs based on at least one of a synchronization signal reference signal received power (SS-RSRP) or an SS reference signal received quality (SS-RSRQ); and
the first node only considers SSBs for which using associated beams for the uplink transmissions from the first node is not expected to cause the excessive interference.

8. The apparatus of claim 6, wherein the at least one processor and the memory are configured to select an SSB and an associated random access channel (RACH) configuration to access a cell detected based on the monitoring.

9. The apparatus of claim 8, wherein the at least one processor and the memory are configured to consider an SSB for selection if it has a synchronization signal reference signal received power (SS-RSRP) at or below a second threshold value of the one or more threshold values.

10. The apparatus of claim 9, wherein:
the at least one processor and the memory are configured to select a detected SSB with a lower SS-RSRP than one or more other detected SSBs if no SSB is detected with an SS-RSRP at or below the second threshold value;
the at least one processor and the memory are further configured to perform a RACH procedure based on the selected SSB and a RACH configuration that is modified relative to a default RACH configuration; and
the modification to the RACH configuration comprises a reduced maximum number of retransmissions.

11. The apparatus of claim 9, wherein the at least one processor and the memory are configured to refrain from performing a RACH procedure for the detected cell if no SSB is detected with an SS-RSRP at or below the second threshold value.

12. The apparatus of claim 6, wherein the at least one processor and the memory are configured to identify a cell as suitable for selection or reselection if at least one beam is found, based on the monitoring, for which the uplink transmissions from the first node are not expected to cause the excessive interference.

13. The apparatus of claim 12, wherein the at least one processor and the memory are configured to find the at least one beam for which the uplink transmissions from the first node are not expected to cause the excessive interference based on whether the estimated uplink received power, if the first node transmits on the at least one beam at the minimum supported transmit power, is at or below the first threshold value of the one or more threshold values.

14. The apparatus of claim 6, wherein:
the one or more threshold values comprise at least two threshold values; and
the at least two threshold values are different.

15. The apparatus of claim 14, wherein the one or more threshold values are:
defined by a standard specification;
indicated by network signaling; or
calculated by the first node.

16. The apparatus of claim 15, wherein the at least one processor and the memory are configured to calculate the one or more threshold values based on a RACH configuration of a cell.

17. The apparatus of claim 16, wherein the at least one processor and the memory are configured to calculate the one or more threshold values based on a RACH target receive power and an offset value.

18. The apparatus of claim 17, wherein the offset value is configured to be zero.

19. The apparatus of claim 17, wherein the at least one processor and the memory are configured to calculate the one or more threshold values based on a RACH target receive power after a maximum number of power ramping steps.

20. The apparatus of claim 17, wherein the at least one processor and the memory are configured to calculate the one or more threshold values based on a RACH initial target receive power.

21. An apparatus for wireless communications, comprising:
at least one processor coupled to a memory configured to:
determine a configuration of one or more metrics associated with synchronization signal block (SSB) transmissions monitored by a first node of one or more wireless nodes to use in selecting a beam or cell, wherein the one or more metrics comprise a first threshold value and indicate potential interference caused by uplink transmissions from the first node, and wherein the beam is selected for which the uplink transmissions from the first node using the selected beam at a minimum supported transmit power of the first node do not cause excessive interference based on whether an estimated uplink received power is at or below the first threshold value, and wherein the excessive interference is defined based on the first threshold value; and
transmit an indication of the configuration to the first node.

22. The apparatus of claim 21, wherein:
the apparatus comprises a network entity of an integrated access and backhaul (IAB) network; and
the first node comprises a node of the IAB network.

23. The apparatus of claim 21, wherein the one or more metrics comprise one or more threshold values.

24. The apparatus of claim 23, wherein the first node is configured to identify a cell as suitable for selection or reselection if an estimated uplink received power if the first node transmits on the beam at the first transmit power is at or below a first threshold value of the one or more thresholds.

25. The apparatus of claim 24, wherein the first threshold value comprises a random access channel (RACH) target receive power threshold value.

26. A method for wireless communications by a first node of a network, comprising:
monitoring synchronization signal block (SSB) transmissions from one or more network entities; and
selecting a beam or cell associated with one of the one or more network entities based on:
the monitoring; and
one or more metrics associated with the monitored SSB transmissions, the one or more metrics comprise a first threshold value and are indicative of potential interference caused by uplink transmissions from the first node, wherein the selecting further comprises selecting the beam for which the uplink transmissions from the first node using the selected beam at a minimum supported transmit power of the first node do not cause excessive interference based on whether an estimated uplink received power is at or below the first threshold value, and wherein the excessive interference is defined based on the first threshold value.

27. The method of claim 26, wherein the one or more metrics comprise one or more threshold values.

28. A method for wireless communications by a network entity, comprising:
determining a configuration of one or more metrics associated with synchronization signal block (SSB) transmissions monitored by a first node of one or more wireless nodes to use in selecting a beam or cell, wherein the one or more metrics comprise a first threshold value and indicate potential interference caused by uplink transmissions from the first node, and wherein the beam is selected, for which the uplink transmissions from the first node using the selected beam at a minimum supported transmit power of the first node do not cause excessive interference, based on whether an estimated uplink received power is at or below the first threshold value, and wherein the excessive interference is defined based on the first threshold value; and
transmitting an indication of the configuration to the first node.

29. The method of claim 28, wherein:
the network entity comprises a network entity of an integrated access and backhaul (IAB) network; and
the first node comprises a node of the IAB network.

30. The method of claim 28, wherein the one or more metrics comprise one or more threshold values.

* * * * *